(12) United States Patent
Burner et al.

(10) Patent No.: US 7,627,854 B2
(45) Date of Patent: Dec. 1, 2009

(54) GRAPHICAL AID FOR GENERATING OBJECT SETUP SCRIPTS

(75) Inventors: Dell Blair Burner, Gilroy, CA (US); Brett Austin Johnson, Seattle, WA (US); Yat On Lau, San Jose, CA (US); Michael Wei Mao, San Jose, CA (US); Daina Edvina Pupons Wickham, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 11/330,832

(22) Filed: Jan. 12, 2006

(65) Prior Publication Data

US 2007/0162891 A1  Jul. 12, 2007

(51) Int. Cl.
G06F 9/44 (2006.01)
G06F 9/45 (2006.01)

(52) U.S. Cl. ............... 717/115; 717/114; 717/116

(58) Field of Classification Search ......... 717/107–116; 345/418, 594
See application file for complete search history.

(56) References Cited

U.S. PATENT DOCUMENTS

| | | | | |
|---|---|---|---|---|
| 6,035,119 | A * | 3/2000 | Massena et al. | 717/100 |
| 6,311,320 | B1 * | 10/2001 | Jibbe | 717/111 |
| 6,539,538 | B1 * | 3/2003 | Brewster et al. | 717/115 |
| 6,625,803 | B1 * | 9/2003 | Massena et al. | 717/100 |
| 6,701,514 | B1 * | 3/2004 | Haswell et al. | 717/115 |
| 6,738,964 | B1 * | 5/2004 | Zink et al. | 717/105 |
| 6,871,221 | B1 * | 3/2005 | Styles | 709/221 |
| 6,889,374 | B1 * | 5/2005 | Wainwright | 717/115 |
| 6,931,633 | B1 * | 8/2005 | Vazquez et al. | 717/131 |
| 6,948,152 | B2 * | 9/2005 | Dubovsky | 717/124 |
| 6,968,539 | B1 * | 11/2005 | Huang et al. | 717/115 |

(Continued)

FOREIGN PATENT DOCUMENTS

CN   1816043 A   8/2006

(Continued)

OTHER PUBLICATIONS

Helander, "Deeply embedded XML communication towards an interoperable and seamless world", ACM EMSOFT, pp. 62-67, 2005.*

(Continued)

*Primary Examiner*—Anil Khatri
(74) *Attorney, Agent, or Firm*—Yee & Associates, P.C.; Doug H. Lefeve

(57) ABSTRACT

A computer implemented method, data processing system, and computer usable code are provided for automatically generating object setup scripts. A form is presented to a user in a graphical user interface. The user provides input in a set of fields within the form, which is received and validated. A set of object setup scripts are then generated based on the user input to the form. To generate the set of object setup scripts based on the user input an analysis is performed on the set of fields as a set of objects, and at least one variable is set to hold the value of the set of objects. String manipulations are used to obtain the values in the set of fields, and the values are entered into the set of object setup scripts.

24 Claims, 6 Drawing Sheets

U.S. PATENT DOCUMENTS

| | | | |
|---|---|---|---|
| 6,981,215 B1 * | 12/2005 | Lindhorst et al. | 715/207 |
| 7,103,873 B2 * | 9/2006 | Tanner et al. | 717/109 |
| 7,178,129 B2 * | 2/2007 | Katz | 717/108 |
| 7,315,830 B1 * | 1/2008 | Wirtz et al. | 705/26 |
| 7,543,267 B2 * | 6/2009 | Lindhorst et al. | 717/105 |
| 2003/0061357 A1 | 3/2003 | Hertling et al. | 709/227 |
| 2004/0098472 A1 | 5/2004 | Styles et al. | 709/221 |
| 2004/0246515 A1 | 12/2004 | Patton et al. | 358/1.15 |
| 2005/0125728 A1 | 6/2005 | Peiro et al. | 715/523 |
| 2005/0144595 A1 | 6/2005 | McLean | 717/136 |
| 2005/0251789 A1 | 11/2005 | Peck et al. | 717/113 |

FOREIGN PATENT DOCUMENTS

| | | |
|---|---|---|
| JP | 2001265644 A2 | 9/2001 |
| JP | 2002271719 A2 | 9/2002 |
| JP | 2005092744 A2 | 4/2005 |

OTHER PUBLICATIONS

Grechanik et al, "Maintaining and evolving GUI directed test scripts", IEEE, pp. 408-418, 2009.*

Freeman et al, "Evolving an embedded domain specific language in Java", ACM OOPSLA, pp. 855-865, 2006.*

Gray et al, "Modern languages and Microsoft's Component Object Model", Comm. of the ACM, vol. 51, No. 5, pp. 55-65, 1998.*

Mukherjee, "Automating forms Publishing with the Intelligent Filing Manager", IEEE SMC '99, 1999 IEEE International Conference on Systems, Man and Cybernetics, Part I, vol. 1, pp. 208-313.

* cited by examiner

Setting up WebSphere MQ objects on the source system
1. On the source system, open a new command window and use the following command to create the queue manager.
    crtmqm QM1
2. Open a text editor such as Notepad. Copy and paste the following code into a new file:

```
*S2. Restart queue
DEFINE QLOCAL('ASN.QM1.RESTARTQ') DEFPSIST(YES)
*S3. Administration queue
DEFINE QLOCAL('ASN.QM1.ADMINQ') DEFPSIST(YES)
*S4. Send queue
DEFINE QREMOTE('ASN.QM1_TO_QM2.DATAQ') RNAME('ASN.QM1_TO_QM2.DATAQ') RQMNAME('QM2') XMITQ('QM2') DEFPSIST(YES)
*S5. Transmission queue
DEFINE QLOCAL('QM2') USAGE(XMITQ) DEFPSIST(YES)
*S6. Sender channel
DEFINE CHL ('QM1_TO_QM2') CHLTYPE(SDR) TRPTYPE(TCP) CONNAME('192.168.0.3(1414)') XMITQ('QM2') DISCINT (0)
*S7. Receiver channel
DEFINE CHL ('QM2_TO_QM1') CHLTYPE(RCVR) TRPTYPE(TCP)
*Start the channel:
START CHL ('QM1_TO_QM2')
```

3. Save the file as uni_source.txt
4. Start the source queue manager:
    strmqm QM1
5. Run the uni_source.txt script by issuing the following command:
    Linux or UNIX: runmqsc QM1<filepath/uni_source.txt
    Windows:       runmqsc QM1<filepath\uni_source.txt
6. Start the listener:
    Linux or UNIX: runmqlsr-t tcp-m QM1-p 1414 &         (Runs in the background)
    Windows:       start runmqlsr-t tcp-m QM1-p 1414    (Runs in a new window that will not show any output)
Proceed to page 3 to begin setting up WebSphere MQ objects on the target system.

Next>>

FIG. 6B

Setting up WebSphere MQ objects on the target system
1. On the target system, open a new command window and use the following command to create the queue manager.
   crtmqm QM2
2. Open a text editor such as Notepad. Copy and paste the following code into a new file:

```
*T2. Receive queue
DEFINE QLOCAL('ASN.QM1_TO_QM2.DATAQ') DEFPSIST(YES)
*T3. Administration queue
DEFINE QREMOTE('ASN.QM1.ADMINQ') RNAME('ASN.QM1.ADMINQ') RQMNAME('QM1') XMITQ('QM1') DEFPSIST(YES)
*T4. Transmission queue
DEFINE QLOCAL('QM1') USAGE(XMITQ) DEFPSIST(YES)
*T5. Sender channel
DEFINE CHL ('QM2_TO_QM1') CHLTYPE(SDR) TRPTYPE(TCP) CONNAME('192.168.0.2(1414)') XMITQ('QM1') DISCINT (0)
*T6. Receiver channel
DEFINE CHL ('QM1_TO_QM2') CHLTYPE(RCVR) TRPTYPE(TCP)
*T7. Spill queue
DEFINE QMODEL('IBMQREP.SPILL.MODELQ') DEFSOPT(SHARED) MAXDEPTH(500000) MSGDLVSQ(FIFO) DEFTYPE(PERMDYN)
*Start the channel:
START CHL ('QM2_TO_QM1')
```

3. Save the file as uni_target.txt
4. Start the target queue manager:
   strmqm QM2
5. Run the uni_target.txt script by issuing the following command:
   Linux or UNIX: runmqsc QM2<filepath/uni_target.txt
   Windows:       runmqsc QM2<filepath\uni_target.txt
6. Start the listener:
   Linux or UNIX: runmqlsr-t tcp-m QM2-p 1414 &      (Runs in the background)
   Windows:       start runmqlsr-t tcp-m QM2-p 1414  (Runs in a new window that will not show any output)
Now you can use the Replication Center or ASNCLP command-line program to specify the objects that you created.

Setting up WebSphere MQ objects on the source system

You must finish filling out the entire form to generate the scripts.

The following fields still need to be completed:"

- Q Apply schema
- Q Apply server
- Q Capture schema
- Q Capture server
- Administration queue (T3)
- Apply Queue manager (T1)
- Capture admin queue (S3)
- Capture queue manager (S1)
- Capture restart queue (S2)
- Receiver channel (S7)
- Receiver channel (T6)
- Receive queue (T2)
- Replication queue map
- Sender channel (T5)
- Sender channel (S6)
- Send queue (S4)
- Source IP address (S8)
- Target IP address (T8)
- Transmission queue (T4)
- Transmission queue (S5)

}702

GRAPHICAL AID FOR GENERATING OBJECT SETUP SCRIPTS

BACKGROUND OF THE INVENTION

1. Field of the Invention

The present invention relates generally to objects used in programming. More particularly, the present invention relates to a computer implemented method, data processing system, and computer usable code for a graphical aid for generating object setup scripts.

2. Description of the Related Art

In Object-Oriented Programming (OOP), an instance of a program, that is to say a program running in a computer, is treated as a dynamic set of interacting objects. Objects in object-oriented programming extend the more general notion of objects described above to include a very specific kind of typing, which among other things allows for: data members that represent the data associated with the object or methods that access the data members in predefined ways.

In the case of most objects, data members are only accessed through the method members, making it easy to guarantee that the data will always remain in a well-defined state. However, some languages do not make distinctions between data members and methods. In a language where each object is created from a class, an object is called an instance of that class. If each object has a type, two objects with the same class would have the same data type. Creating an instance of a class is sometimes referred to as instantiating the class.

The messaging infrastructure for replication of objects may be complex and differ depending on a user's replication environment. A remote, unidirectional replication configuration may require a user to create a number of different objects with required properties. Bidirectional or peer-to-peer replication configurations are even more complex. Responsibility for setting up replication typically falls to database administrators that may not have exposure to the messaging software. Moreover, the configuration of the messaging infrastructure has been pinpointed as a point of difficulty for many administrators.

In addition to creating the required queue managers, queues, and channels, a replication administrator must understand how to declare objects within a replication metadata store. There is significant written documentation and diagrams that are provided to explain these object relationships used during replication. Thus, the generation of objects is an issue for many users and, for companies that have separate development groups, there are added issues of communicating the required objects, settings, and relationships to and from administrators and users.

SUMMARY OF THE INVENTION

The different aspects of the present invention provide a computer implemented method, data processing system, and computer usable code for automatically generating object setup scripts. A form is presented to a user in a graphical user interface. User input is received in a set of fields within the form. The user input is validated and a set of object setup scripts are generated based on the user input. In generating the set of object setup scripts based on the user input, the set of fields are analyzed as a set of objects. At least one variable is set to hold the value of the set of objects and string manipulations are used to obtain the values in the set of fields. Finally, the values are entered into the set of object setup scripts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B depict the script and instructions that are generated by script command generator in accordance with an illustrative embodiment of the present invention; and FIG. 7 depicts an error list in accordance with an illustrative embodiment of the present invention.

DETAILED DESCRIPTION OF THE PREFERRED EMBODIMENT

Figure 1:
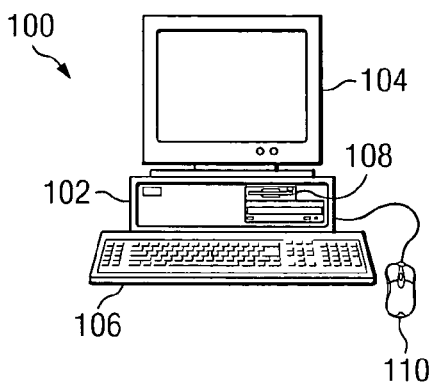
FIG. 1 depicts a pictorial representation of a data processing system in which the aspects of the present invention may be implemented.

The present invention provides for a graphical aid for automatically generating object setup scripts. With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM® eServer™ computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
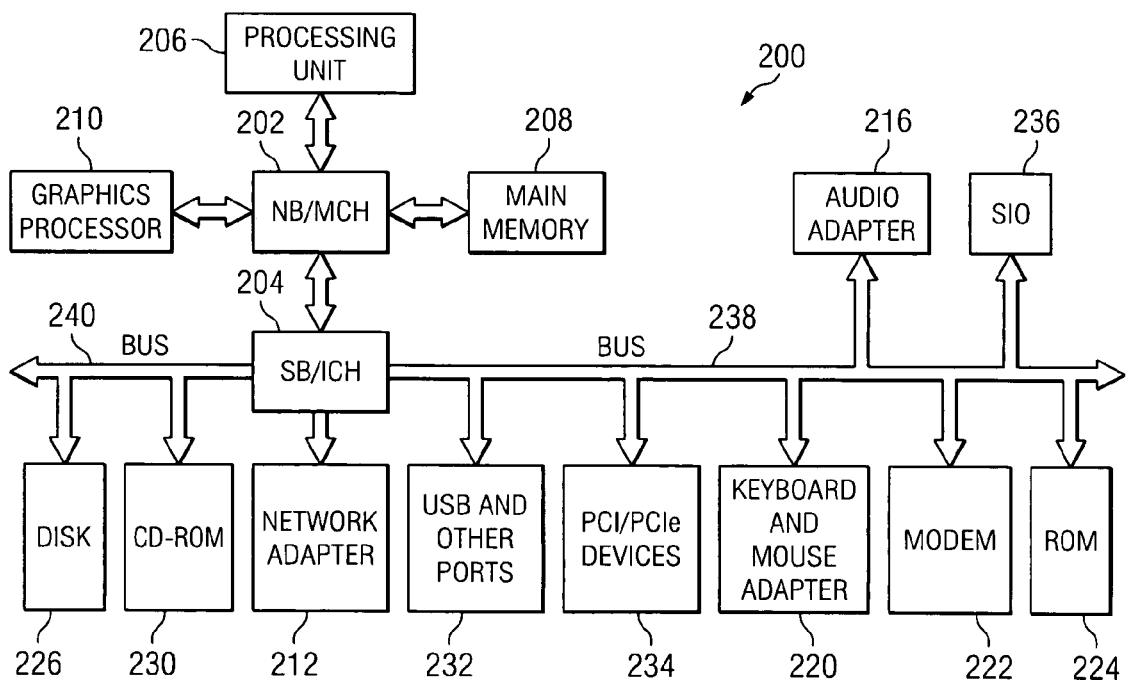
FIG. 2 depicts a block diagram of a data processing system is shown in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a graphical checklist that allows a user to more easily understand what fields are required, the required properties associated with the fields, recommended naming conventions, and where fields must be persisted in the replication metadata store.

Figure 3:
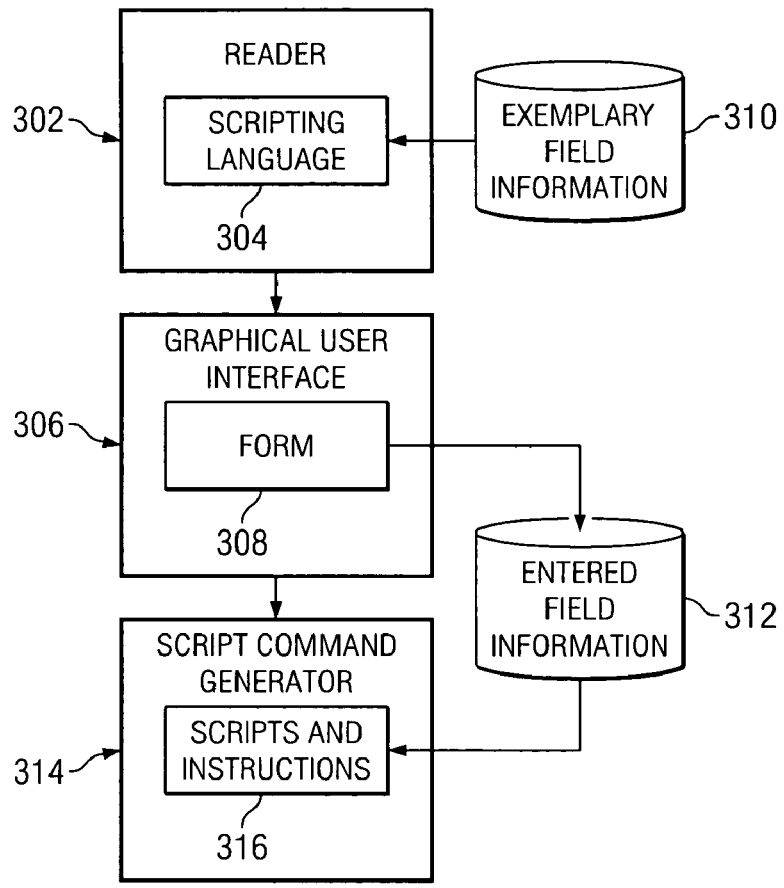
FIG. 3 depicts a functional block diagram of the components used to automatically generate object setup scripts in accordance with an illustrative embodiment of the present invention.

Turning now to FIG. 3, a functional block diagram of the components used to automatically generate object setup scripts is depicted in accordance with an illustrative embodiment of the present invention. Automatic object setup script generation employs reader 302 that uses embedded scripting language 304 to create and display customized scripts, procedures, instructions, customized documents, or customized forms based on the input that a user provides. A reader, as used herein, is a computer program or computer implemented process that helps users read texts. A scripting language is a computer programming language that scripts the operations of a computer. A script is a program written in a scripting language and is normally used to facilitate tasks that are mundane. Reader 302 may be implemented using a reader, such as Adobe® Acrobat® or Microsoft® Word, and scripting language 304 may be implemented using a scripting language, such as JavaScript™ or VBScript®. By embedding scripting language 304 into reader 302, field values may be accessed based on the information a user types into fields within a form. Generally, a "reader" program, such as reader 302, which supports embedded languages, contains a dialog, window, or toolbars that allow a user to enter custom scripts. A form is a set of controls that allows a user to enter data, select values, and make information available to a system. A document may contain only form fields and may or may not be formatted. Scripting language 304 also allows for manipulation of field values using common programming functions for manipulating strings or even mathematical operations.

The scripts, procedures, customized documents, or customized forms created by scripting language 304 are displayed using graphical user interface (GUI) 306 as form 308. Graphical user interface 306 is a graphic tool that allows form 308 to be modified with user specific properties. Graphical user interface 306 is software that may be stored in main memory 208 and displayed using graphics processor 210 of FIG. 2. Form 308 may be considered a graphical checklist where scripting language 304 requires a valid value be entered into each required field.

In these illustrative examples, as the user modifies form 308, scripting language 304 within reader 302 provides exemplary field information 310. Exemplary field information 310 may be, for example, information stored in a data structure that may be an option provided to the user where some exemplary field values are dynamically populated in response to the user inputting values into other fields. Additionally, some fields may require specific values which may be accessed by the user through, for example, a drop-down menu.

When the user indicates that all entries have been made, a check or validation is run by scripting language 304 to determine if all required fields are filled and the values in those fields conform to basic field rules. Depending on the field properties, some exemplary field rule checks may be numbers, legal internet protocol (IP) addresses, and length of field information. If errors are determined, scripting language 304 provides an error indication to the user through graphical user interface 306. The user may then be requested to correct the error and then indicate that all entries have been made.

Once form 308 is verified, the data of form 308 is stored in entered field information 312. Entered field information 312 is completed information that is stored on a data structure. Scripting language 304 indicates to script command generator 314 that form 308 is complete. Then script command generator 314 generates scripts and instructions 316 based on the values entered into form 308. Scripting language 304 may be used to implement objects, methods, and properties to further generate scripts from user input. Script command generator 314 may use a scripting language to analyze a document's fields as objects. The scripting language of script command generator 314 sets a variable to hold the current value of that object, such as "var strServerName=this.getField("SourceServerField")." Then script command generator 314 may use string manipulations to "pull" or "grab" field entries from the document. The string manipulations are used after the values have been set to a variable and only if there is a need to validate, parse, split, or in some method manipulate the value that is pulled or grabbed out of the field. The field entries are checked and dropped into scripts generated by script command generator 314. Scripts and instructions 316 may then be used to create the required objects at the systems involved in the replication configuration.

Thus, the benefit of the illustrative embodiments is the embedded form fields and scripting language within the same reader as the graphical checklist, and the use of those fields and the scripting language to turn the reader document into a tool that creates customized scripts based on the user's input. The users may then follow the customized instructions that are tailored for a particular system by the scripting language, and run the created customized scripts to create all of the objects that are required.

Figure 4:
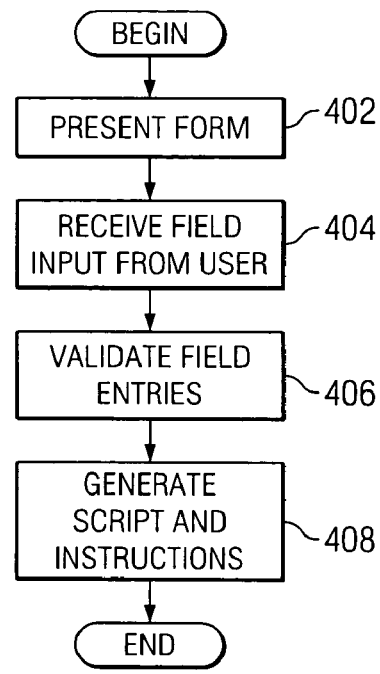
FIG. 4 is a flowchart depicting the operation used in automatically generating object setup scripts in accordance with an illustrative embodiment of the present invention.

FIG. 4 is a flowchart depicting the operation used in automatically generating object setup scripts in accordance with an illustrative embodiment of the present invention. As the operation begins, a user is presented with a document or graphical checklist that contains one or more fields (step 402). The form may contain exemplary values in some fields or the fields may dynamically populate as the user inputs values into other fields. The document or graphical checklist may be presented using a reader in a graphical user interface, such as reader 302 and graphical user interface 306 of FIG. 3. The user enters values into the fields of the document (step 404). The field values are then validated using basic field rules to ensure that field values are valid (step 406). Once all field values are validated, scripts and instructions are generated along with instructions for how to run the script (step 408). A script command generator, such as script command generator 314 of FIG. 3, uses a scripting language to analyze the document's fields as objects. The scripting language of script command generator 314 sets a variable to hold the current value of that object, such as "var strServerName=this.getField("SourceServerField")." Then script command generator 314 may use string manipulations to "pull" or "grab" field entries from the document. The string manipulations are used after the values have been set to a variable and only if there is a need to validate, parse, split, or in some method manipulate the value that is pulled or grabbed out of the field. The operation then terminates.

The form or graphical checklist groups or visually distinguishes fields in various ways. Some exemplary groupings or distinctions may be fields for which scripts are generated or fields for which scripts are not generated. Another exemplary grouping or distinction may be identifying fields that are created in a graphical user interface dialog box. The dialog box may indicate fields that are grouped together so that the user may use the graphical checklist as an aid even if a decision is made not to use the script that may be generated.

Figure 5:
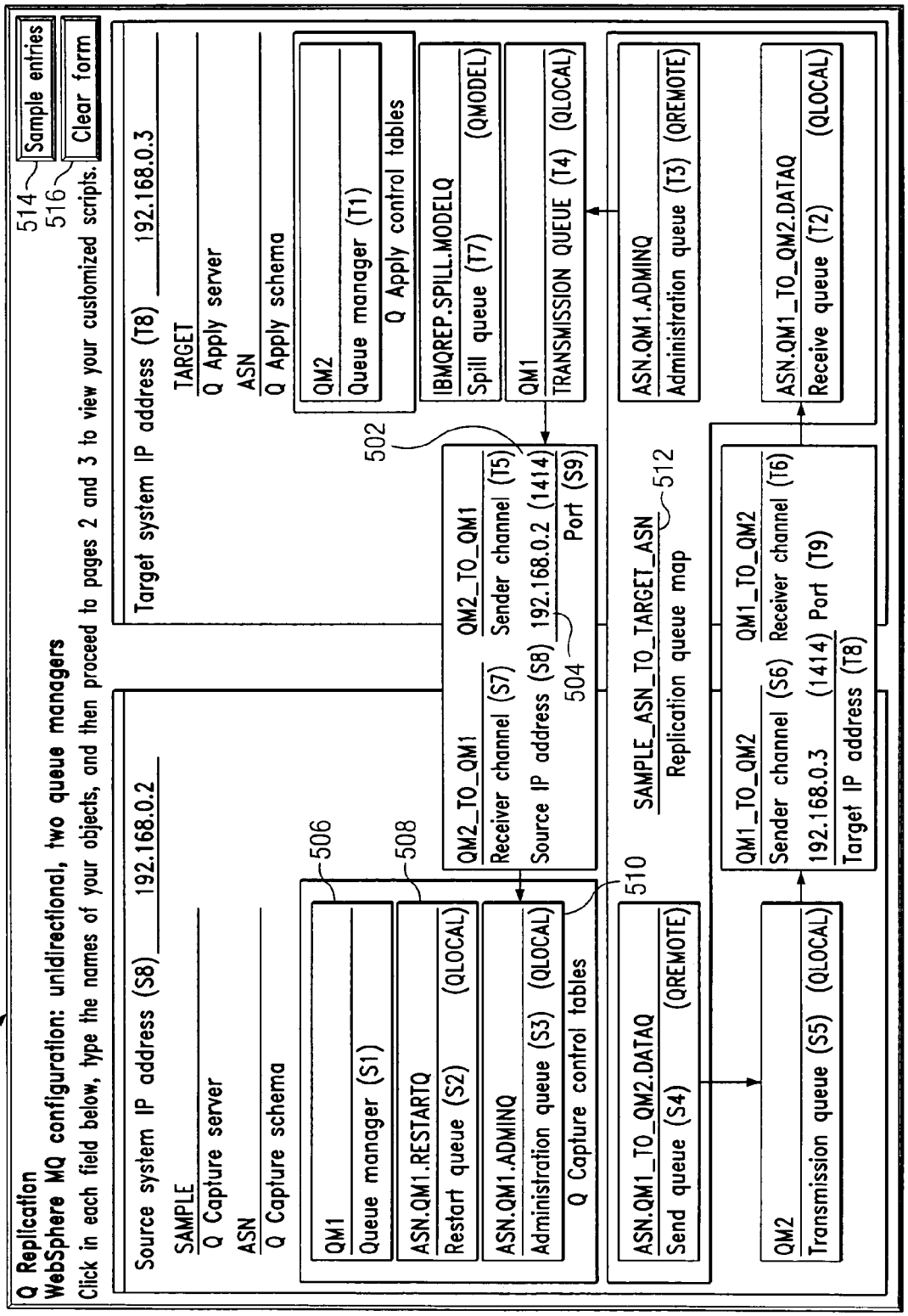
FIG. 5 depicts a completed form in accordance with an illustrative embodiment of the present invention.

FIG. 5 depicts a completed form in accordance with an illustrative embodiment of the present invention. Exemplary form 500 is a WebSphere® MQ configuration for Q Replication, although any type of form may be presented to the user. Form 500 may be generated using a scripting language in a reader, such as reader 302 using scripting language 304 of FIG. 3. Although form 500 shows the entire field entries filled in, the fields may be dynamically inserted as the user provides input to other fields. Additionally, the fields in form 500 may be grouped by various colored box schemes, text schemes or shading schemes in order to represent different objects on the servers. Although not shown, an example may be yellow boxes that represent objects that make up Control Tables, blue boxes that represent objects that make up a Replication Queue Map, and grey boxes that represent WebSphere® MQ objects such as queues and channels. As an example, as a user inputs a value into port number 502, the value input may be dynamically input into source IP address 504. Additionally, as a user inputs a value into queue manager 506, an exemplary value may be inserted into restart queue 508 and administration queue 510 using a common naming convention. In either case, the user may opt to change the value without an error being generated as long as the changed value meets the basic form rules. Using standard naming conventions for each of the fields and based on the user input, numerous fields may be automatically populated with standard entries. Each time a user enters a field or leaves a field, every single field on the form is "recalculated" with updated values.

All of the fields requiring user input have associated properties. Some fields, such as port number 502, may be limited to only numbers. Other fields, such as replication queue map 512 may be limited in length of input to forty-eight characters. Other properties may be to limit an entry to an IP address where four sets of numbers are required where each set has to be less than 255. Finally, sample entries button 514 may be selected by the user to populate all of the fields with sample entries. Likewise, clear form button 516 may be selected or if a user wants to start over.

FIGS. 6A and 6B depict the scripts and instructions that are generated by script command generator in accordance with an illustrative embodiment of the present invention. The scripts and instructions generated in FIGS. 6A and 6B may be scripts and instructions such as scripts and instructions 316 generated by script command generator 314 of FIG. 3. Scripts and instructions 602 indicate the six instructions and the required scripts necessary to set up queue manager QM1. Scripts and instructions 604 indicate the six instructions and the required scripts necessary to set up queue manager QM2. Exemplary scripts and instructions 602 and 604 are for setting up WebSphere® MQ objects; however, any type of object scripts and instructions may be generated.

FIG. 7 is an error list in accordance with an illustrative embodiment of the present invention. Error list 702 shows the fields of a form, such as form 500 of FIG. 5, that require an entry. The user may then use the error list to return to the form and complete the required field entries. Exemplary errors 702 are for setting up WebSphere® MQ objects; however, any type of errors may be generated.

Thus, the illustrative embodiments of the present invention provides a graphical checklist that helps the user understand the relationship between all the objects and the two different programs, such as Q Replication and WebSphere® MQ, by showing the user a graphical representation of the relationship. The illustrative embodiments may be used to display complicated relationships graphically. The graphic fields assist in automating and increasing the speed of completing various setup tasks.

The illustrative embodiments may also be used for event publishing and job control language scripts. For example, an ecommerce company that has a PDF document that can be given to the sales department in order to add a product to a website. The PDF contains a graphical representation of a "Look" of the current website with field entries where such information as titles and prices would go. The sales department fills out all of the fields: title, price, description, weight, etc. When finished an "upload" button is clicked and automatically the PDF takes the input, checks it, and runs the insert queries against the database. The advantage is the scripting is very quick and enables the end user to not worry about the programming or how to insert into the database.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically generating object setup scripts, the computer implemented method comprising:

presenting a form to a user in a graphical user interface of a reader on a computer, wherein the reader comprises an embedded scripting language;

receiving user input in a set of fields within the form into a memory of the computer, wherein the form functions as a graphical checklist and the set of fields contains required fields;

validating the user input by the computer to create validated input;

responsive to the validated input, generating, by the computer, a set of programming language object setup scripts using the validated input; and generating instructions for how to run the set of programming language object setup scripts; and executing the generated instructions for running the set of programming language object setup scripts.

2. The computer implemented method of claim 1, wherein generating the set of object setup scripts using the validated input further comprises:

analyzing the set of fields as a set of objects;

setting at least one variable to hold the value of the set of objects;

using string manipulations to obtain the values from the set of fields to form pulled values; and entering the pulled values into the set of programming language object setup scripts.

3. The computer implemented method of claim 1, wherein the form is a graphical checklist that provides a visual relationship between one or more fields within the set of fields.

4. The computer implemented method of claim 3, wherein the visual relationship is distinguished by at least one of color, font, or shading.

5. The computer implemented method of claim 1, wherein the form is created using a scripting language.

6. The computer implemented method of claim 1, further comprising:

automatically populating unpopulated fields within the set of fields based using the validated input.

7. The computer implemented method of claim 1, further comprising:

automatically populating unpopulated fields upon identification of a request to populate the unpopulated fields with sample entries.

8. The computer implemented method of claim 1, wherein the form is one of a display customized script, a procedure, a customized document, or a customized form.

9. A data processing system comprising:

a bus system;

a communications system connected to the bus system;

a memory connected to the bus system, wherein the memory includes a set of instructions; and a processing unit connected to the bus system, wherein the processing unit executes the set of instructions to present a form to a user in a graphical user interface of a reader on a computer, wherein the reader comprises an embedded scripting language;

receive user input in a set of fields within the form into a memory of the computer, wherein the form functions a graphical checklist and the set of fields contains required fields;

validate the user input by the computer to create validated input;

responsive to the validated input, generate, by the computer, a set of programming language object setup scripts using the validated input; and generate instructions for how to run the set of programming language object setup scripts; and executing the generated instructions for running the set of programming language object setup scripts.

10. The data processing system of claim 9, wherein the processing unit executing the set of instructions to generate the set of object setup scripts using the validated input includes the processing unit executing the set of instructions to analyze the set of fields as a set of objects; set at least one variable to hold the value of the set of objects; use string manipulations to obtain the values from the set of fields to form pulled values; and enter the pulled values into the set of programming language object setup scripts.

11. The data processing system of claim 9, wherein the form is a graphical checklist that provides a visual relationship between one or more fields within the set of fields.

12. The data processing system of claim 11, wherein the visual relationship is distinguished by at least one of color, font, or shading.

13. The data processing system of claim 9, wherein the form is created using a scripting language.

14. The data processing system of claim 9, wherein the processing unit executes the set of instructions to automatically populate unpopulated fields within the set of fields based using the validated input.

15. The data processing system of claim 9, wherein the processing unit executes the set of instructions to automatically populate unpopulated fields upon identification of a request to populate the unpopulated fields with sample entries.

16. The data processing system of claim 9, wherein the form is one of a display customized script, a procedure, a customized document, or a customized form.

17. A computer program product comprising:

a computer-readable storage medium including computer executable program code stored therein for automatically generating object setup scripts, the computer executable program code comprising:

computer executable program code for presenting a form to a user in a graphical user interface of a reader on a computer, wherein the reader comprises an embedded scripting language;

computer executable program code for receiving user input in a set of fields within the form into a memory of the computer, wherein the form functions as a graphical checklist and the set of fields contains required fields;

computer executable program code for validating the user input by the computer to create validated input;

computer executable program code responsive to the validated input for generating a set of programming language object setup scripts using the validated input; and computer executable program code for generating instructions for how to run the set of object setup scripts; and executing the generated instructions for running the set of programming language object setup scripts.

18. The computer program product of claim 17, wherein the computer executable program code for generating the set of programming language object setup scripts using the validated input further includes:

computer executable program code for analyzing the set of fields as a set of objects;

computer executable program code for setting at least one variable to hold the value of the set of objects;

computer executable program code for using string manipulations to obtain the values from the set of fields to form pulled values; and computer executable program code for entering the pulled values into the set of programming language object setup scripts.

19. The computer program product of claim 17, wherein the form is a graphical checklist that provides a visual relationship between one or more fields within the set of fields.

20. The computer program product of claim 19, wherein the visual relationship is distinguished by at least one of color, font, or shading.

21. The computer program product of claim 17, wherein the form is created using a scripting language.

22. The computer program product of claim 17, further including:

computer executable program code for automatically populating unpopulated fields within the set of fields using the validated input.

23. The computer program product of claim 17, further including:

computer executable program code for automatically populating unpopulated fields upon identification of a request to populate the unpopulated fields with sample entries.

24. The computer program product of claim 17, wherein the form is one of a display customized script, a procedure, a customized document, or a customized form.

* * * * *

UNITED STATES PATENT AND TRADEMARK OFFICE
CERTIFICATE OF CORRECTION

PATENT NO. : 7,627,854 B2  Page 1 of 1
APPLICATION NO. : 11/330832
DATED : December 1, 2009
INVENTOR(S) : Burner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Second Day of November, 2010

David J. Kappos
*Director of the United States Patent and Trademark Office*